(12) United States Patent
Xia et al.

(10) Patent No.: US 10,324,248 B2
(45) Date of Patent: Jun. 18, 2019

(54) FILM, BACKLIGHT MODULE AND DISPLAY DEVICE

(71) Applicants: BOE TECHNOLOGY GROUP CO., LTD., Beijing (CN); HEFEI BOE DISPLAY LIGHTING CO., LTD., Hefei, Anhui (JP)

(72) Inventors: Jitai Xia, Beijing (CN); Qiping Zhang, Beijing (CN); Wenbo Sun, Beijing (CN)

(73) Assignees: BOE TECHNOLOGY GROUP CO., LTD., Beijing (CN); HEFEI BOE DISLAY LIGHTING CO., LTD., Hefei, Anhui (CN)

( * ) Notice: Subject to any disclaimer, the term of this patent is extended or adjusted under 35 U.S.C. 154(b) by 0 days.

(21) Appl. No.: 15/567,872

(22) PCT Filed: Apr. 7, 2017

(86) PCT No.: PCT/CN2017/079718
§ 371 (c)(1),
(2) Date: Oct. 19, 2017

(87) PCT Pub. No.: WO2018/036170
PCT Pub. Date: Mar. 1, 2018

(65) Prior Publication Data
US 2018/0292597 A1 Oct. 11, 2018

(30) Foreign Application Priority Data

Aug. 23, 2016 (CN) .......................... 2016 1 0711590

(51) Int. Cl.
*F21V 8/00* (2006.01)

(52) U.S. Cl.
CPC ......... *G02B 6/0051* (2013.01); *G02B 6/0088* (2013.01); *G02B 6/0055* (2013.01)

(58) Field of Classification Search
None
See application file for complete search history.

(56) References Cited

U.S. PATENT DOCUMENTS 7,517,134 B2 *  4/2009  Hu ................... G02F 1/133606
                                                    362/362
7,583,353 B2 *  9/2009  Kujiraoka ........... G02B 6/0088
                                                    349/187

(Continued)

FOREIGN PATENT DOCUMENTS

CN    101071227 A    11/2007
CN    102519011 A    6/2012

(Continued)

OTHER PUBLICATIONS

ISR & Written Opinion dated Jul. 4, 2017; PCT/CN2017/079718.

*Primary Examiner* — Elmito Breval
(74) *Attorney, Agent, or Firm* — Ladas & Parry LLP

(57) ABSTRACT

A film, a backlight module and a display device are provided. The film includes: a first body having a platy structure, a protrusion protruded from an edge of the first body in a plane where the first body is located, and a positioning structure intersected with one surface of the protrusion wherein the positioning structure includes a second body and one or more openings; the second body includes a blocking portion and a connecting portion; the blocking portion is connected with the protrusion through the connecting portion; and the one or more openings are disposed between the blocking portion and the protrusion.

19 Claims, 12 Drawing Sheets

(56) References Cited

U.S. PATENT DOCUMENTS

| | | | |
|---|---|---|---|
| 8,111,351 B2* | 2/2012 | Cho | G02F 1/133608 |
| | | | 349/58 |
| 8,550,688 B2* | 10/2013 | Seo | G02F 1/133608 |
| | | | 349/58 |
| 2006/0007708 A1* | 1/2006 | Lee | G02B 6/0088 |
| | | | 362/632 |
| 2012/0170250 A1* | 7/2012 | Huang | G02F 1/133605 |
| | | | 362/97.1 |
| 2013/0222735 A1 | 8/2013 | Huang | |
| 2014/0055983 A1* | 2/2014 | Min | G09F 13/04 |
| | | | 362/97.1 |

FOREIGN PATENT DOCUMENTS

| | | |
|---|---|---|
| CN | 102661553 A | 9/2012 |
| CN | 103104891 A | 5/2013 |
| CN | 103631053 A | 3/2014 |
| CN | 205920302 U | 2/2017 |
| JP | 2011-216275 A | 1/2011 |

\* cited by examiner

FILM, BACKLIGHT MODULE AND DISPLAY DEVICE

TECHNICAL FIELD

At least one embodiment of the disclosure relates to a film, a backlight module and a display device.

BACKGROUND

A liquid crystal display (LCD) mainly includes an LCD panel and a backlight. The backlight may be divided into light-emitting diode (LED) backlight and cold cathode fluorescent lamp (CCFL) backlight according to the variety of light sources; and may be divided into mobile, tablet, notebook, monitor, TV and the like according to the size variety. In recent years, LCDs have been developed very rapidly.

SUMMARY

At least one embodiment of the disclosure relates to a film, a backlight module and a display device, which reduce poor structure and poor image quality caused by the jumping and shifting of an optical film in a backlight module, and improve the structural stability and the quality of the backlight.

At least one embodiment of the disclosure provides a film, comprising: a first body having a platy structure, a protrusion protruded from an edge of the first body in a plane where the first body is located, and a positioning structure intersected with one surface of the protrusion, wherein the positioning structure includes a second body and one or more openings; the second body includes a blocking portion and a connecting portion; the blocking portion is connected with the protrusion through the connecting portion; and the one or more openings are disposed between the blocking portion and the protrusion.

In some examples, the one or more openings have an edge close to the protrusion, and the edge is level with the surface of the protrusion.

In some examples, a length of the one or more openings is ½ to ⅔ of a length of the positioning structure in a direction of an intersecting line of the positioning structure and the protrusion.

In some examples, the positioning structure includes a plurality of openings; and the plurality of openings is sequentially arranged along a direction of an intersecting line of the positioning structure and the protrusion.

In some examples, the connecting portion has a planar surface.

In some examples, an angle between the connecting portion and the protrusion is about 90 degrees.

In some examples, an angle between the blocking portion and the connecting portion is about 90 degrees or 180 degrees.

In some examples, the angle between the blocking portion and the connecting portion is about 90 degrees; and the blocking portion and the protrusion are respectively disposed on both sides of a plane where the connecting portion is located.

In some examples, the protrusion includes one or more openings; and the one or more openings of the protrusion are communicated with the one or more openings of the positioning structure.

In some examples, the blocking portion includes a first blocking portion and a second blocking portion; the first blocking portion is connected with the protrusion through the connecting portion; an angle between the first blocking portion and the connecting portion is about 180 degrees; and an angle between the second blocking portion and the first blocking portion is about 90 degrees.

In some examples, the connecting portion includes a first connecting portion close to the protrusion and a second connecting portion close to the blocking portion; the first connecting portion is intersected with the second connecting portion; the first connecting portion and the second connecting portion have a platy structure; an angle between the first connecting portion and the second connecting portion is about 90 degrees; an angle between the blocking portion and the second connecting portion is about 180 degrees; and an angle between the first connecting portion and the protrusion is about 90 degrees.

In some examples, the connecting portion includes a first part intersected with the protrusion and provided with a plane; and an angle between the first part and the protrusion is greater than 0 degree and less than 180 degrees.

In some examples, the angle between the first part and the protrusion is about 90 degrees.

In some examples, the film is a diffuser.

At least one embodiment of the disclosure provides a backlight module, comprising the film as mentioned above.

In some examples, the backlight module further comprises a frame, wherein the frame includes a groove disposed on an inner side of the frame and recessed into a body of the frame; the film is disposed in the frame; and the protrusion of the film is disposed in the groove of the frame to position the film.

In some examples, the backlight module further comprises a second film, wherein the second film includes a body having a platy structure and a protrusion protruded from an edge of the body of the second film in a plane where the body of the second film is located; and the protrusion of the second film passes through the one or more openings of the positioning structure to position the second film.

In some examples, the protrusion of the second film includes a first protrusion close to the body of the second film and one or more second protrusions protruded from an edge of the first protrusion away from the body of the second film; and the one or more second protrusions pass through the one or more openings of the positioning structure.

In some examples, the frame includes two projections projected from both ends of the groove to the middle of the groove, between the groove of the frame and an outer side of the frame; the two projections are spaced from each other in an extension direction of the frame; and at least one part of the blocking portion of the first film is lapped over the two projections.

At least one embodiment of the disclosure provides a display device, comprising the backlight module as mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terminology or scientific terminology used herein should have the general meanings understood by those skills in the art to which the disclosure belongs. The "first", "second" and similar words used in the disclosure application specification and claims do not mean any sequence, amount or importance, but are merely used to distinguish different components. Likewise, the word "comprise", "include" or the like only indicates that an element or a component before the word contains elements or components listed after the word and equivalents thereof, not excluding other elements or components. "Connecting" or "connected" and similar words are not limited to the physical or mechanical connection, but may comprise electrical connection, no matter directly or indirectly. The words "on", "beneath", "left", "right" and the like only indicate the relative position relationship which is correspondingly changed when the absolute position of a described object is changed.

Figure 1:
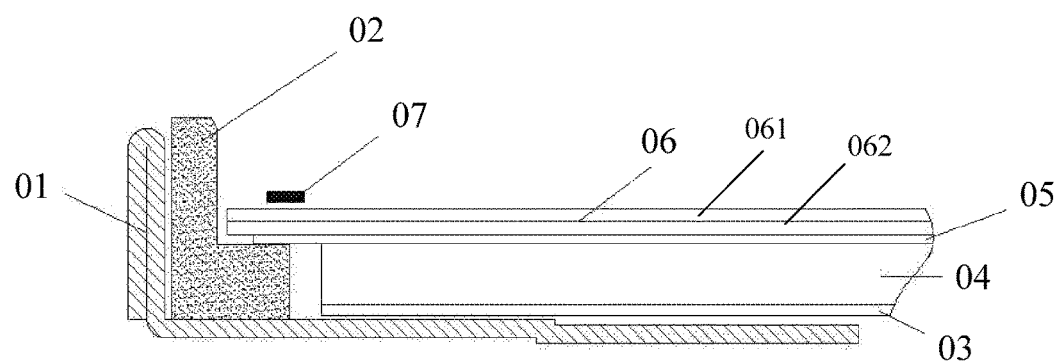
FIG. 1 is a schematic structural view of a backlight module.

FIG. 1 is a schematic sectional view of a conventional notebook (NB) backlight at a film fixing position. A frame 02 is disposed in a backplane 01; in an area limited by the frame 02 in the backplane 01, a reflector 03, a light guide plate (LGP) 04, a diffuser 05 and a brightness enhancement film 06 are sequentially arranged in the direction from close to the bottom surface of the backplane 01 to away from the bottom surface of the backplane 01; and a film fixing adhesive tape 07 is configured to fix a film. The brightness enhancement film 06 includes a first brightness enhancement film and a second brightness enhancement film arranged on the diffuser 05 in sequence. But the number of optical films arranged on the diffuser is not limited thereto, for example, may be one or more than two. No limitation will be given here in the embodiment of the disclosure.

Figure 2:
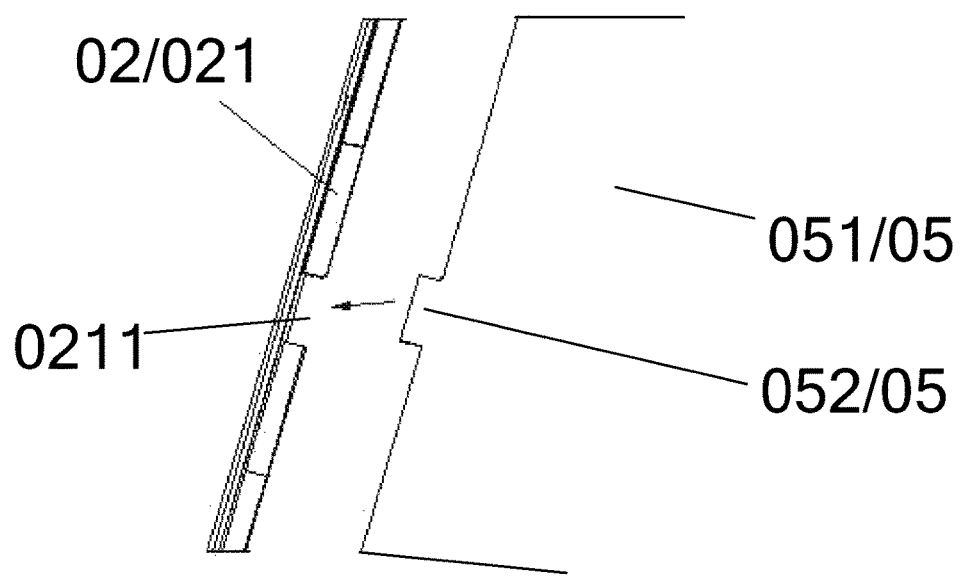
FIG. 2 is a schematic diagram illustrating the assembly of a frame and a diffuser in the backlight module.

FIG. 2 is a schematic structural assembly diagram of the NB backlight at the film fixing position. The frame 02 includes a groove (notch) 0211. The diffuser 05 includes a body 051 having a platy structure and a protrusion 052 protruded from the body 051 at an edge of the body 051 in a plane where the body 051 is located. The material of the diffuser 05, for example, includes but not limited to polyethylene terephthalate (PET). After a semi-finished product is obtained after the assembly of the reflector 03, the LGP 04, the frame 02 and the backplane 01, firstly, the diffuser 05 is disposed in the frame 02, and meanwhile, the protrusion 052 (may also be referred to as a positioning wing) of the diffuser 05 is disposed in the groove 0211 of the frame 02; secondly, the brightness enhancement film 06 (the brightness enhancement film 06 includes the first brightness enhancement film 061 and the second brightness enhancement film 062) is sequentially superimposed on the diffuser 05; and thirdly, the film fixing adhesive tape 07 is utilized to fix all the optical films, in combination with the groove 0211 in the frame 02.

Figure 3A:
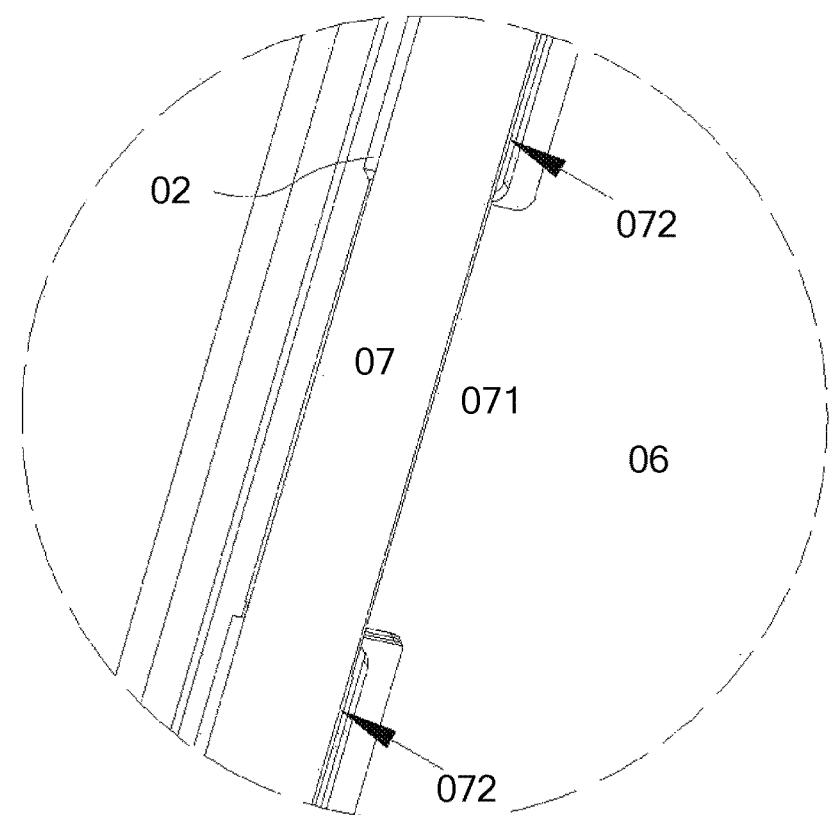
FIG. 3a is a schematic diagram illustrating the case of adopting a film fixing adhesive tape to fix a film in the backlight module.

Poor phenomenon of sheet wrinkle can be easily caused due to the expansion characteristic of the diffuser 05 under high-temperature condition in a condition of complete pinning, so the film at the positioning wing cannot be completely bonded by the film fixing adhesive tape 07; therefore the hidden danger will be avoided when arranging the structure of the film fixing adhesive tape. FIG. 3a is a partial enlarged view of the conventional NB backlight at the position of the film fixing adhesive tape. Arrows at both ends in FIG. 3a represent an adhesive area 072 of the film fixing adhesive tape 07, and a part between the two arrows corresponding to the positioning wing is a non-adhesive area 071. The groove depth of a groove structure in the frame 02 after assembly is only about 0.05-0.1 mm higher than an upper surface of the brightness enhancement film 06; the bonding area of colloid is limited; and together with shaking during transport, the adhesive force of the film fixing adhesive tape 07 is easy to fail and disintegrate. The film is shifted, resulting in the overlarge thickness of an LCD at a local position. As for a module of a diffuser with printing black borders, poor image quality such as line missing is more likely to occur as the black borders are shifted and shield edge pixels, so the product quality cannot be guaranteed. Therefore, it's a problem demanding prompt solution.

Figure 3B:
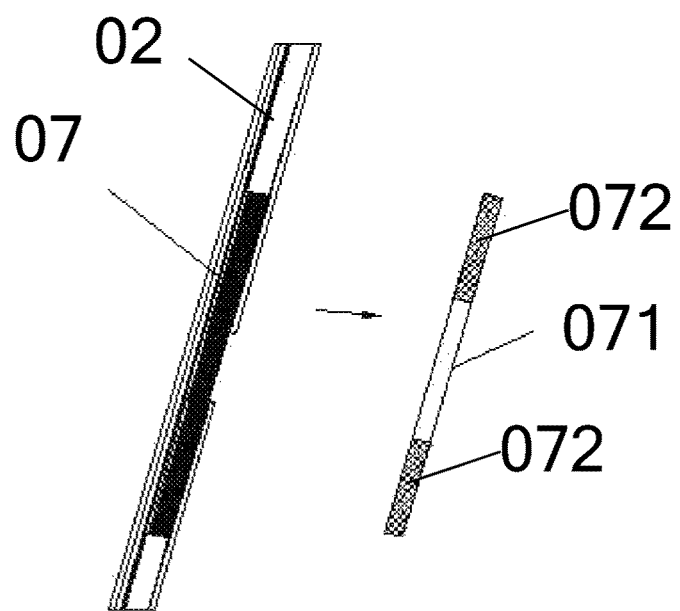
FIG. 3b is a schematic diagram illustrating the case that the film fixing adhesive tape is at a positioning wing of the diffuser in the backlight module.

As illustrated by the schematic structural view of the back of the film fixing adhesive tape 07 in FIG. 3b, the glue of the film fixing adhesive tape 07 only exists on two end portions of the adhesive tape (filled dashed areas in the figure), and there is no glue in the middle (an area overlapped with the position of the positioning wing of the film). Thus, under high-temperature condition, the position of the positioning wing of the optical film can be expanded freely, so the poor image quality such as sheet wrinkle will not occur.

At least one embodiment of the disclosure provides a film, which comprises: a first body having a platy structure, a protrusion protruded from an edge of the first body in a plane where the first body is located, and a positioning structure intersected with one surface of the protrusion. The positioning structure includes a second body and one or more openings; the second body includes a blocking portion and a connecting portion; the blocking portion is connected with the protrusion through the connecting portion; and the one or more openings are disposed between the blocking portion and the protrusion.

The film provided by at least one embodiment of the disclosure can effectively reduce poor structure (e.g., overlarge local thickness) and poor image quality (e.g., missing of peripheral lines) caused by the jumping and shifting of the optical film in the backlight module, and improve the structural stability and the quality of the backlight.

Further description will be given below with reference to several embodiments.

First Embodiment

Figure 4A:
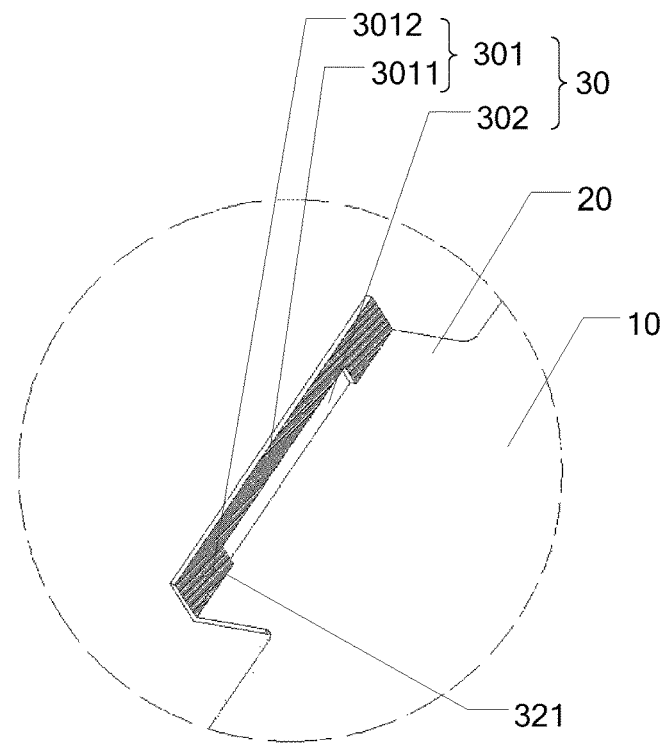
FIG. 4a is a schematic diagram of a film provided by the first embodiment of the disclosure.

As illustrated in FIG. 4a, the embodiment provides a film 1, which comprises: a first body 10 having a platy structure, a protrusion 20 protruded from an edge of the first body 10 in a plane where the first body 10 is located, and a positioning structure 30 intersected with one surface of the protrusion 20. The positioning structure 30 includes a second body 301 and an opening 302; the second body 301 includes a blocking portion 3011 and a connecting portion 3012; the blocking portion 3011 is connected with the protrusion 20 through the connecting portion 3012; and the opening 302 is disposed between the blocking portion 3011 and the protrusion 20. Description is given in FIG. 4a by taking the case of arranging one opening as an example, but the embodiment is not limited thereto, a plurality of openings 302 may also be arranged. For example, the opening 302 may be a hole with a regular pattern such as a rectangle or a circle, but not limited thereto. For example, the border of the one or more openings 302 may be defined by the second body 301 and the protrusion 20. The intersection of A and B means, for example, that A and B have an angle which is greater than 0 degree and less than 180 degrees.

For example, the opening 302 forms a "door opening" structure in the positioning structure 30. Thus, other films can be positioned by the "door opening" structure, so that at least one film can be mutually positioned through the "door opening" structure. Therefore, the embodiment can avoid the jumping and shifting or the mutual misplacement of at least one optical film, avoid poor structure and poor image quality, and improve the structural stability and the quality of the backlight.

Figure 4B:
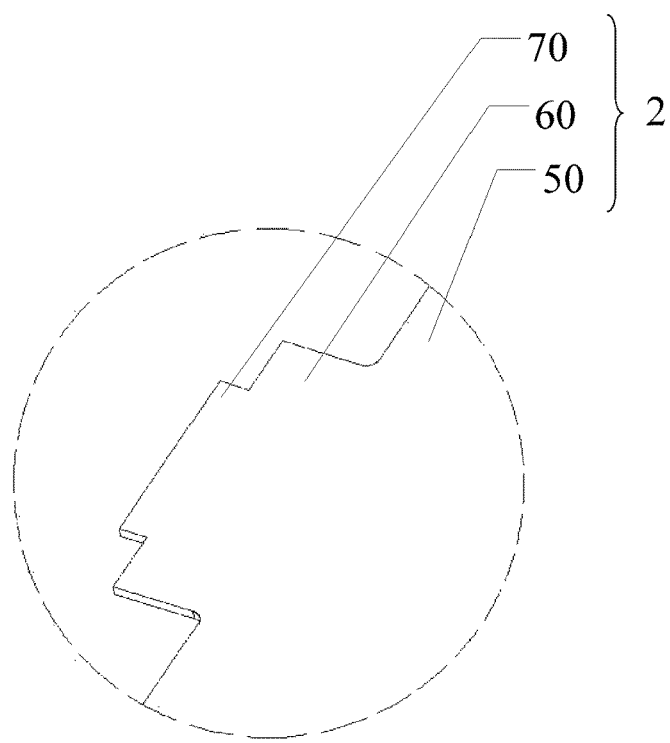
FIG. 4b is a schematic diagram of a positioned film (second film) provided by the first embodiment of the disclosure.

The film 1 may be configured to position a second film (positioned film) 2; and the positioned second film 2 may determine the shape of a second protrusion according to the opening form (the opening form, for example, includes the number, the shape and the like of the openings) of the film 1, so as to be matched with the film 1. For example, as illustrated in FIG. 4b, the second film includes a body 50 having a platy structure, a first protrusion 60 protruded from an edge of the body 50 of the second film 2 in a plane where the body 50 of the second film 2 is located, and a second protrusion 70 protruded from an edge of the first protrusion 60 in a plane where the first protrusion 60 is located. The second protrusion 70 may pass through the opening 302 to position the second film 2. For example, in the direction of an intersecting line 321 (as illustrated in FIG. 4a) of the positioning structure 30 and the protrusion 20, the length of the second protrusion 70 is less than the length of the opening 302, so that the second protrusion 70 can pass through the opening 302. For example, the length of the second protrusion 70 is about 0.5 mm less than the length of the opening 302, which is not limited thereto. For example, the height of the opening 302 is greater than the thickness of the second film 2 and may change according to different thicknesses of the second film 2. For example, the height of the opening 302 is 0.3 mm-0.5 mm, but not limited thereto. That is to say, the protrusion of the second film 2 may include the first protrusion 60 close to the body of the second film and the second protrusion 70 protruded from the edge of the first protrusion 60 away from the body 50 of the second film 2; and the second protrusion 70 passes through the opening 302 of the positioning structure. For example, the number of the second protrusions 70 may be matched with the number of the openings 302. The case of one second protrusion is illustrated in FIG. 4b, and the case of a plurality of protrusions is illustrated in FIG. 11b.

For example, for the second film to be inserted into the "door opening" structure and for the film 1 to be bonded to a surface of the second film 2, as illustrated in FIG. 4a, an edge of the opening 302 close to the protrusion 20 is level with a surface of the protrusion 20. Thus, a lower surface of the positioned second film 2 can be flatly disposed on an upper surface of the film 1. Therefore, the border of the one or more openings 302 may be defined by the blocking portion 3011, the connecting portion 3012 and the protrusion 20.

For example, as illustrated in FIG. 4a, in the direction of the intersecting line 321 of the positioning structure 30 and the protrusion 20, the length of the opening 302 is ½ to ⅔ of the length of the positioning structure 30. When the positioning structure 30 includes a plurality of openings, in the direction of the intersecting line 321 of the positioning structure 30 and the protrusion 20, the length of the plurality of openings 302 is ½ to ⅔ of the length of the positioning structure 30. The length of the plurality of openings refers to the total length of the plurality of openings, namely the sum of the length of each opening.

For example, as illustrated in FIG. 4a, a surface of the connecting portion 3012 is a plane; an angle between the connecting portion 3012 and the protrusion 20 is about 90 degrees (right angle); and an angle between the blocking portion 3011 and the connecting portion 3012 is about 180 degrees (straight angle). It should be noted that description is given in FIG. 4a by taking the above as an example. The surface of the connecting portion 3012 may also be not a plane; the angle between the connecting portion 3012 and the protrusion 20 may also be not a right angle; and the angle between the blocking portion 3011 and the connecting portion 3012 may also be not 180 degrees.

For example, the film 1 may be a diffuser, but not limited thereto. For example, the second film 2 may be a brightness enhancement film, but not limited thereto. For example, the film 1 is a first brightness enhancement film, and the second film 2 is a second brightness enhancement film.

For example, the first body 10, the protrusion 20 and the second body 301 are integrally formed, so as to provide convenience for the manufacturing of the film 1, but not limited to integral forming. For example, at least two components among the first body 10, the protrusion 20 and the second body 301 may be detachably connected, so as to provide convenience for the maintenance of the film. Only partial or all of the first body 10, the protrusion 20 and the second body 301 having trouble are replaced, and not the entire film is required to be replaced.

Second Embodiment

Figure 5:
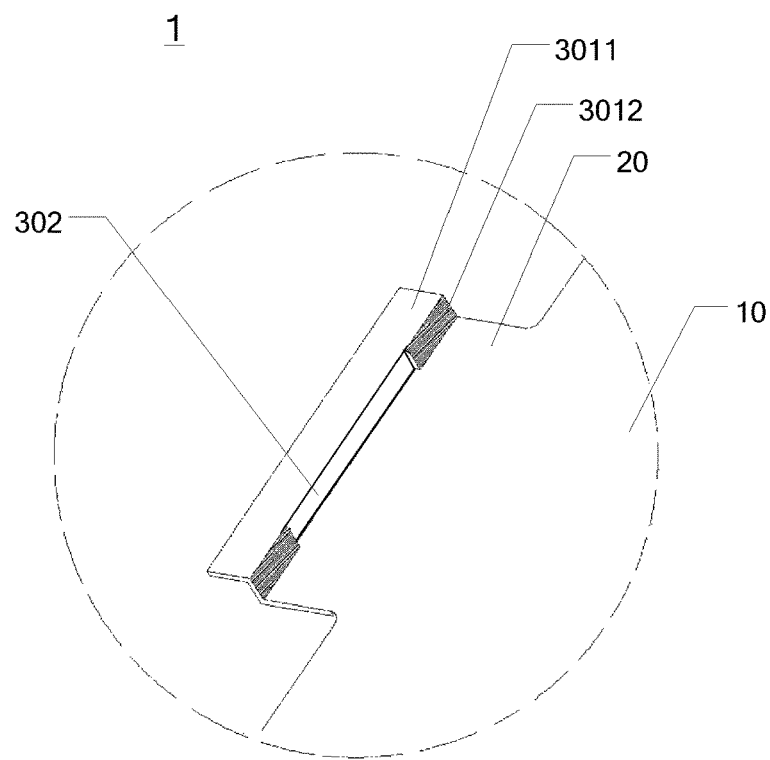
FIG. 5 is a schematic diagram of a film provided by the second embodiment of the disclosure.

The difference between the embodiment and the first embodiment is that: as illustrated in FIG. 5, the angle between the blocking portion 3011 and the connecting portion 3012 is about 90 degrees. The blocking portion 3011 and the connecting portion 3012 are perpendicular to each other, so partial surface of the blocking portion 3011 can be lapped over the frame 02. Therefore, the film can be more stably positioned under the support of the frame and is not likely to shift relative to the frame. For example, the blocking portion 3011 and the protrusion 20 may be disposed on both sides of a plane where the connecting portion 3012 is located.

Third Embodiment

Figure 6A:
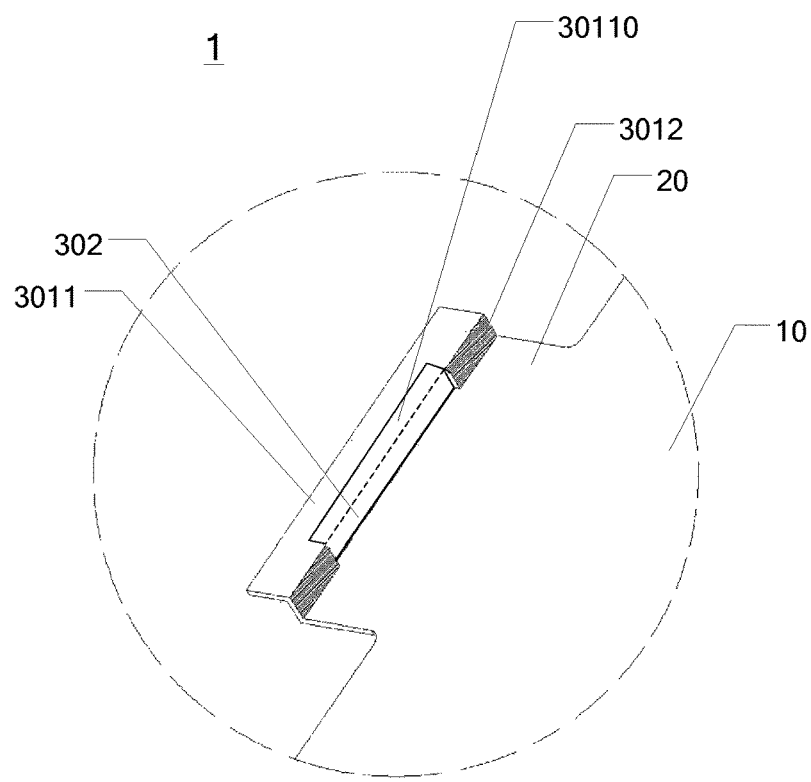
FIG. 6a is a schematic diagram of a film provided by the third embodiment of the disclosure.

The difference between the embodiment and the second embodiment is that: as illustrated in FIG. 6a, the blocking portion 3011 includes an opening 30110; and the opening 30110 of the blocking portion 3011 is communicated with the opening 302 of the positioning structure 30. Therefore, the materials can be saved; the opening space of the positioning structure can be also increased; and the second film can be more conveniently inserted.

Figure 6B:
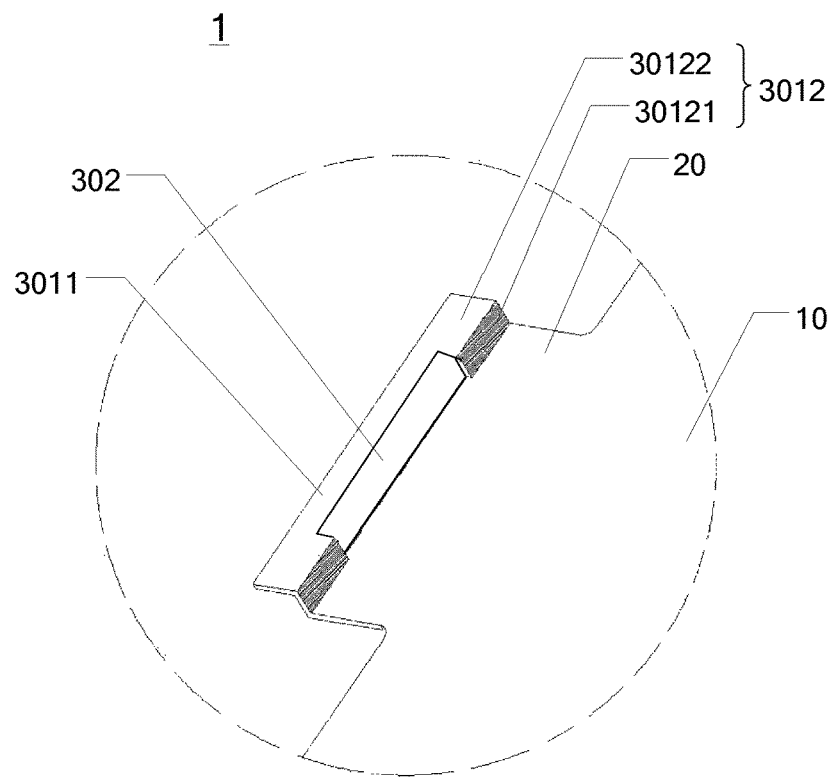
FIG. 6b is a schematic diagram of a film provided by the third embodiment of the disclosure.

In the embodiment, the opening 30110 and the opening 302 may also be considered as one opening, namely the opening 302 of the positioning structure. For example, as illustrated in FIG. 6b, the connecting portion 3012 includes a first connecting portion 30121 close to the protrusion 20 and a second connecting portion 30122 close to the blocking portion 3011; the first connecting portion 30121 is intersected with the second connecting portion 30122; the first connecting portion 30121 and the second connecting portion 30122 have a platy structure; an angle between the first connecting portion 30121 and the second connecting portion 30122 is a right angle; an angle between the blocking portion 3011 and the second connecting portion 30122 is about 180 degrees; and an angle between the first connecting portion 30121 and the protrusion 20 is about 90 degrees. In the embodiment, the surface of the connecting portion 3012 is not a plane.

For example, as illustrated in FIGS. 6a and 6b, the connecting portion 3012 includes a first part (the first connecting portion 30121) intersected with the protrusion 20 and provided with a plane; and an angle between the first part and the protrusion is greater than 0 degree and less than 180 degrees. For example, the angle between the first part and the protrusion 20 is about 90 degrees.

Fourth Embodiment

Figure 7:
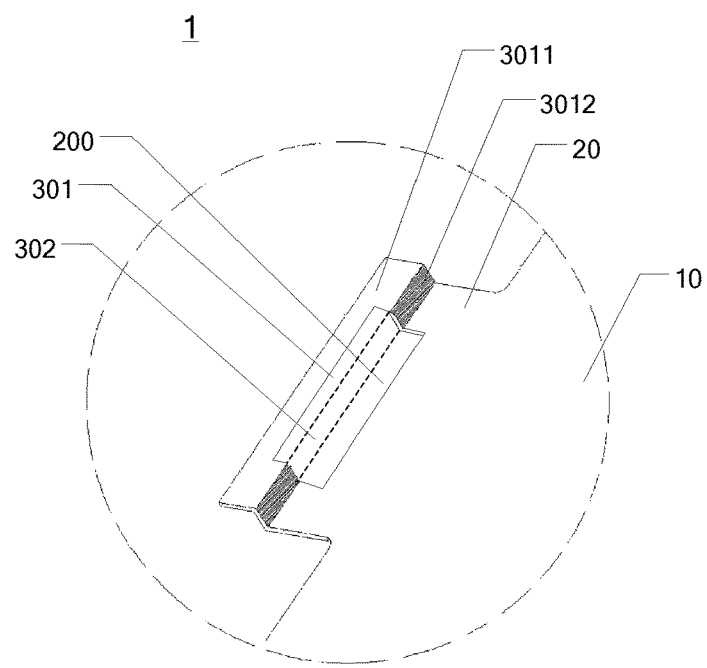
FIG. 7 is a schematic diagram of a film provided by the fourth embodiment of the disclosure.

The difference between the embodiment and the third embodiment is that: as illustrated in FIG. 7, the protrusion 20 further includes an opening 200; the opening 200 of the protrusion 20 is communicated with the opening 302 of the positioning structure 30; and hence the opening 30110 of the blocking portion 3011, the opening 302 of the positioning structure 30, and the opening 200 of the protrusion 20 are communicated with each other. Therefore, the embodiment can further save materials, further increase the opening space of the positioning structure, and is more favorable for the insertion of the second film.

It should be noted that: when the positioning structure 30 includes a plurality of openings 302, the protrusion 20 may include one opening 200; and the opening 200 of the protrusion 20 is communicated with the plurality of openings 302 of the positioning structure 30. When the positioning structure 30 includes the plurality of openings 302, the protrusion 20 may include a plurality of openings 200; the plurality of openings 200 of the protrusion 20 are in one-to-one correspondence with the plurality of openings 302 of the positioning structure 30; and corresponding openings are communicated with each other. No limitation will be given here in the embodiment of the disclosure.

Fifth Embodiment

Figure 8:
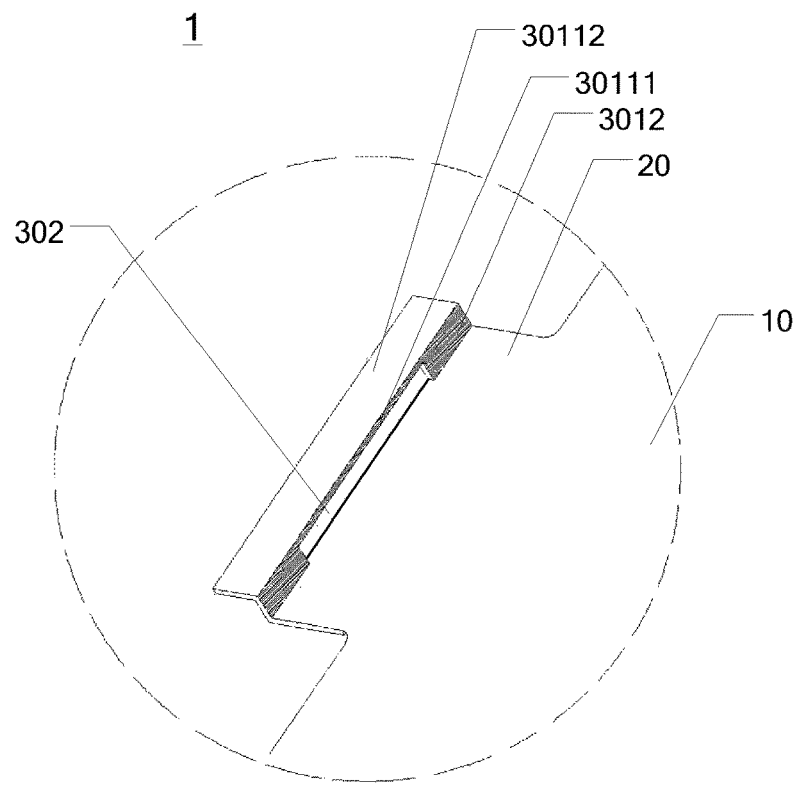
FIG. 8 is a schematic diagram of a film provided by the fifth embodiment of the disclosure.

The difference between the embodiment and the first embodiment 1 is that: as illustrated in FIG. 8, the blocking portion 3011 includes a first blocking portion 30111 and a second blocking portion 30112. The first blocking portion 30111 is connected with the protrusion 20 through the connecting portion 3012; an angle between the first blocking portion 30111 and the connecting portion 3012 is about 180 degrees; and an angle between the second blocking portion 30112 and the first blocking portion 30111 is about 90 degrees. The blocking portion 3011 is set to include the first blocking portion 30111 and the second blocking portion 30112 perpendicular to each other, so the positioned film can have more movable space at a positioned position (the positioning wing), and hence poor phenomenon of sheet wrinkle can be reduced on the premise of not affecting the fixing of the second film.

Sixth Embodiment

Figure 9:
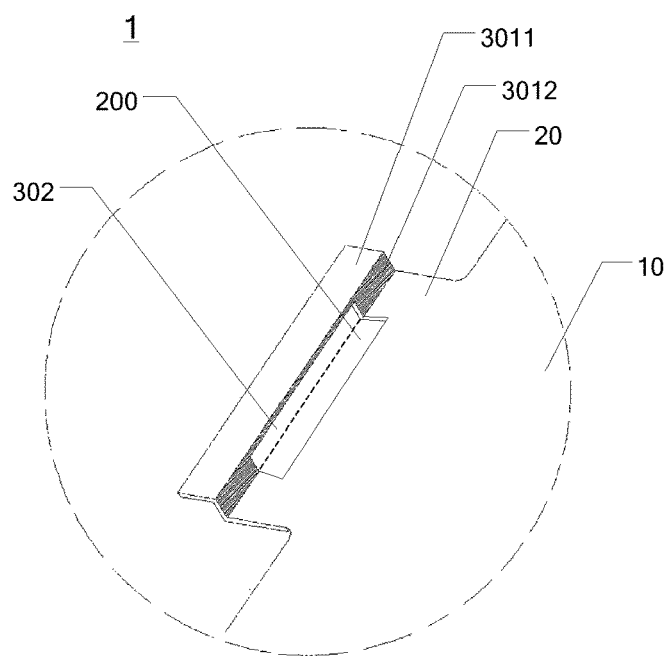
FIG. 9 is a schematic diagram of a film provided by the sixth embodiment of the disclosure.

The difference between the embodiment and the fifth embodiment is that: as illustrated in FIG. 9, the protrusion 20 further includes an opening 200; and the opening 200 of the protrusion 20 is communicated with the opening 302 of the positioning structure 30. Therefore, the embodiment can save materials, can also increase the opening space of the positioning structure, and is favorable for the insertion of the second film.

Seventh Embodiment

Figure 10:
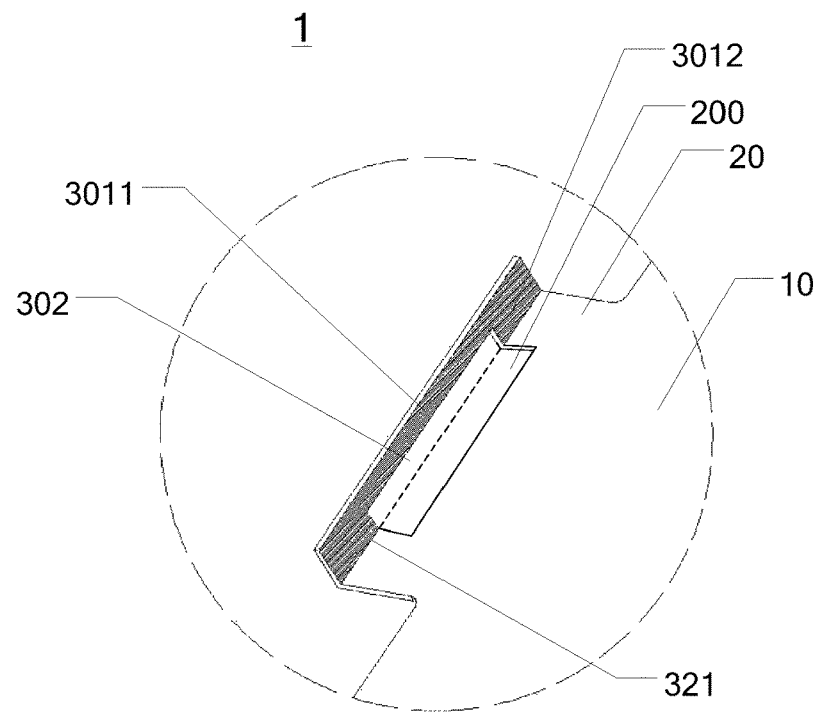
FIG. 10 is a schematic diagram of a film provided by the seventh embodiment of the disclosure.

The difference between the embodiment and the first embodiment is that: as illustrated in FIG. 10, the protrusion 20 further includes an opening 200; and the opening 200 of the protrusion 20 is communicated with the opening 302 of the positioning structure 30. Therefore, the embodiment can save materials, can also increase the opening space of the positioning structure, and is favorable for the insertion of the second film.

Eighth Embodiment

Figure 11A:
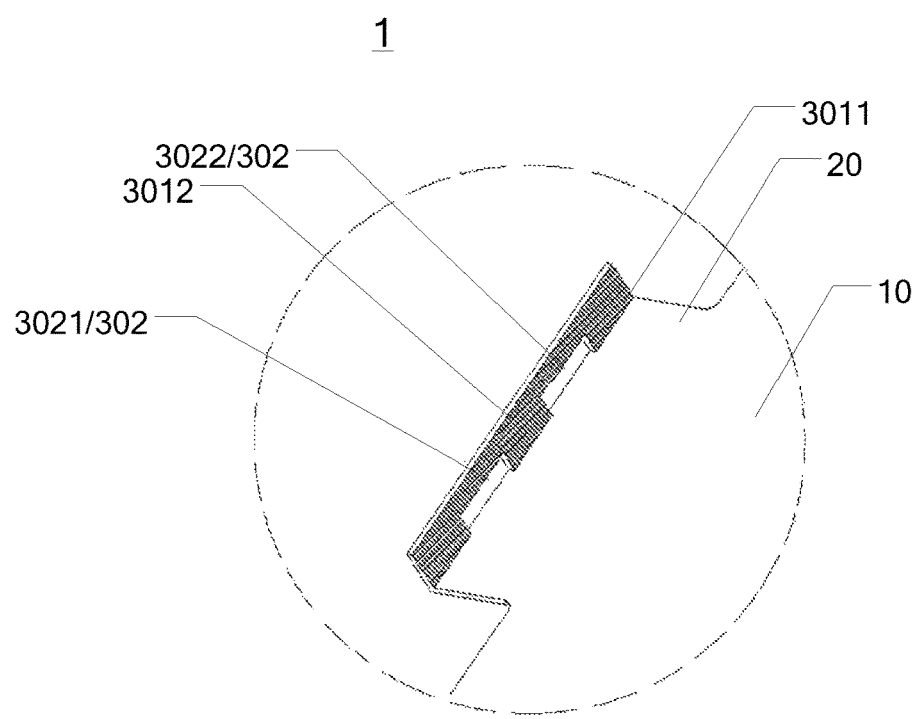
FIG. 11a is a schematic diagram of a film provided by the eighth embodiment of the disclosure.
Figure 11B:
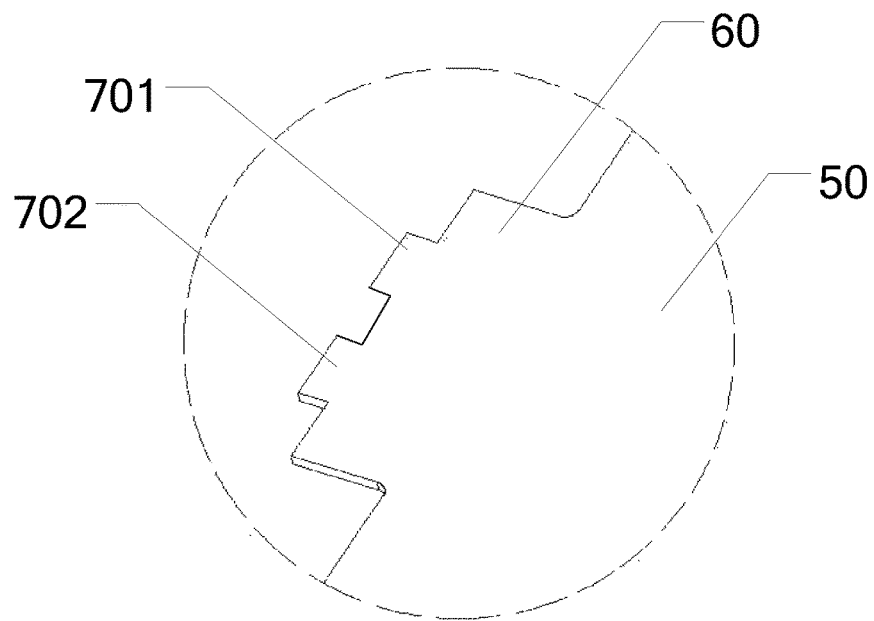
FIG. 11b is a schematic diagram of a positioned film (second film) provided by the eighth embodiment of the disclosure.

The difference between the embodiment and the first embodiment is that: as illustrated in FIG. 11a, the positioning structure 30 includes a plurality of openings 302. FIG. 11a takes the case of including two openings 3021 and 3022 as an example. More than two openings may also be included. No limitation will be given here in the embodiment.

For example, the plurality of openings 302 is sequentially arranged in the direction of the intersecting line of the positioning structure 30 and the protrusion 20.

For example, an edge of each opening 302 close to the protrusion 20 is level with the surface of the protrusion 20.

For example, in the direction of the intersecting line of the positioning structure 30 and the protrusion 20, the length of the plurality of openings 302 is ½ to ⅔ of the length of the positioning structure 30.

Figure 11C:
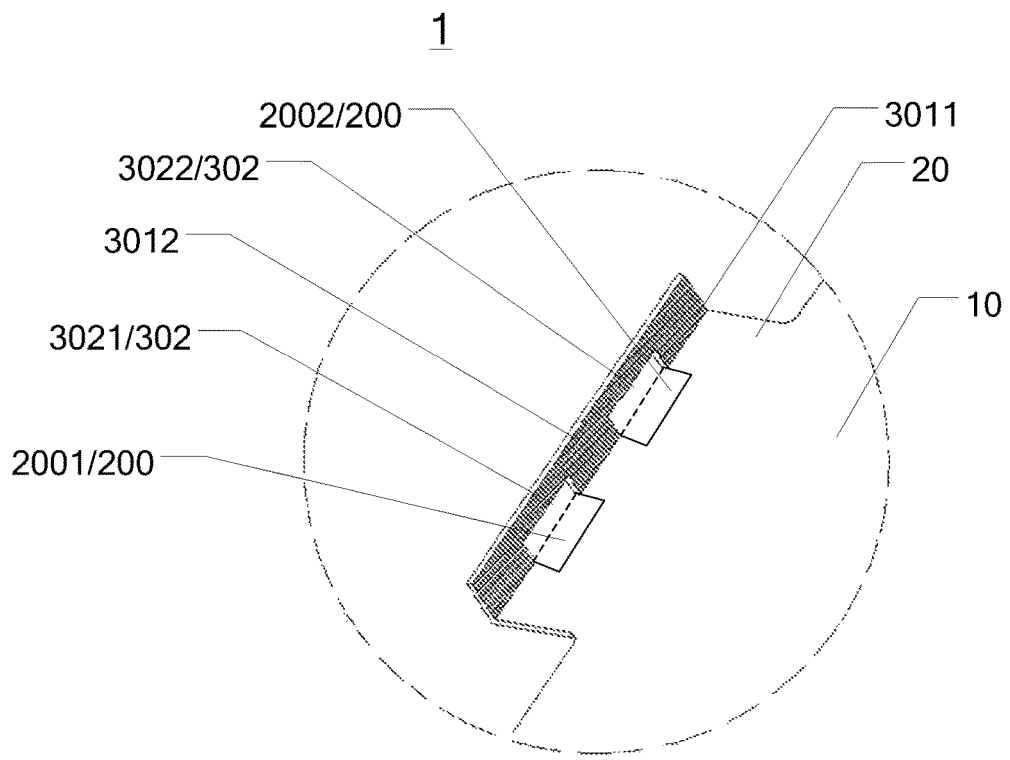
FIG. 11c is a schematic diagram of another film provided by the eighth embodiment of the disclosure.
Figure 11D:
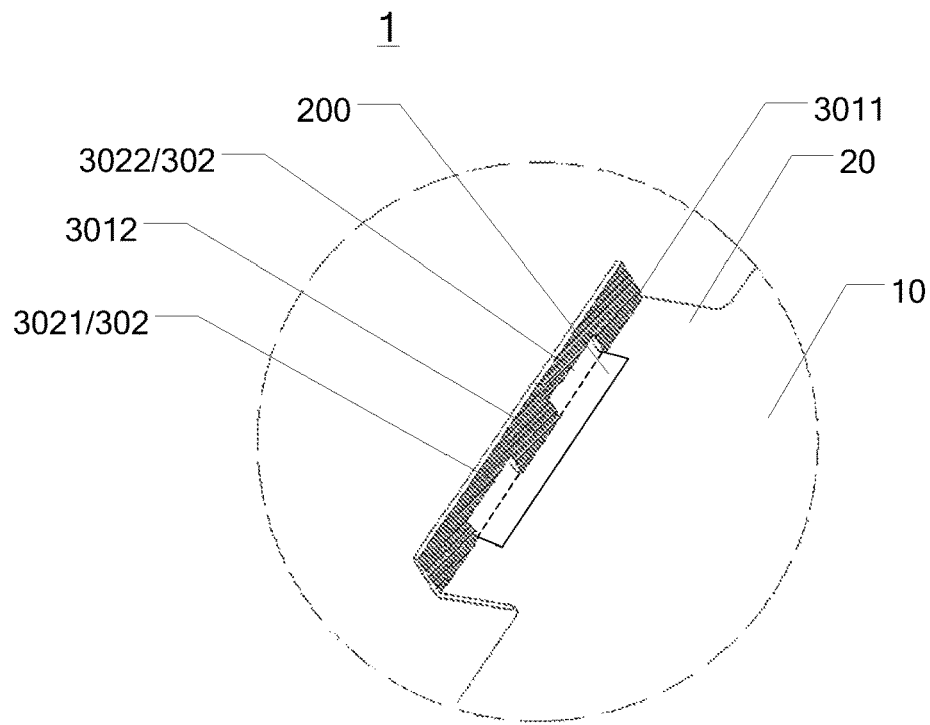
FIG. 11d is a schematic diagram of another film provided by the eighth embodiment of the disclosure.

For example, as illustrated in FIGS. 11c and 11d, the protrusion 20 may include one or more openings 200; and the one or more openings 200 of the protrusion 20 are communicated with the one or more openings 302 of the positioning structure 30. In FIG. 11c, the protrusion 20 includes a plurality of openings 200; the plurality of openings 200 of the protrusion 20 are in one-to-one correspondence with the plurality of openings 302 of the positioning structure 30; and corresponding openings are communicated with each other. For example, in FIG. 11c, an opening 3021 of the positioning structure 30 corresponds to and is communicated with an opening 2001 of the protrusion 20; and an opening 3022 of the positioning structure 30 corresponds to and is communicated with an opening 2002 of the protrusion 20. In FIG. 11d, the protrusion 20 includes one opening 200; and the opening 200 of the protrusion 20 is communicated with the plurality of openings 302 of the positioning structure 30.

As illustrated in FIG. 11b, the second protrusion 70 includes two protruding parts 701 and 702, so as to be matched with two openings 3021 and 3022.

Ninth Embodiment

Figure 12:
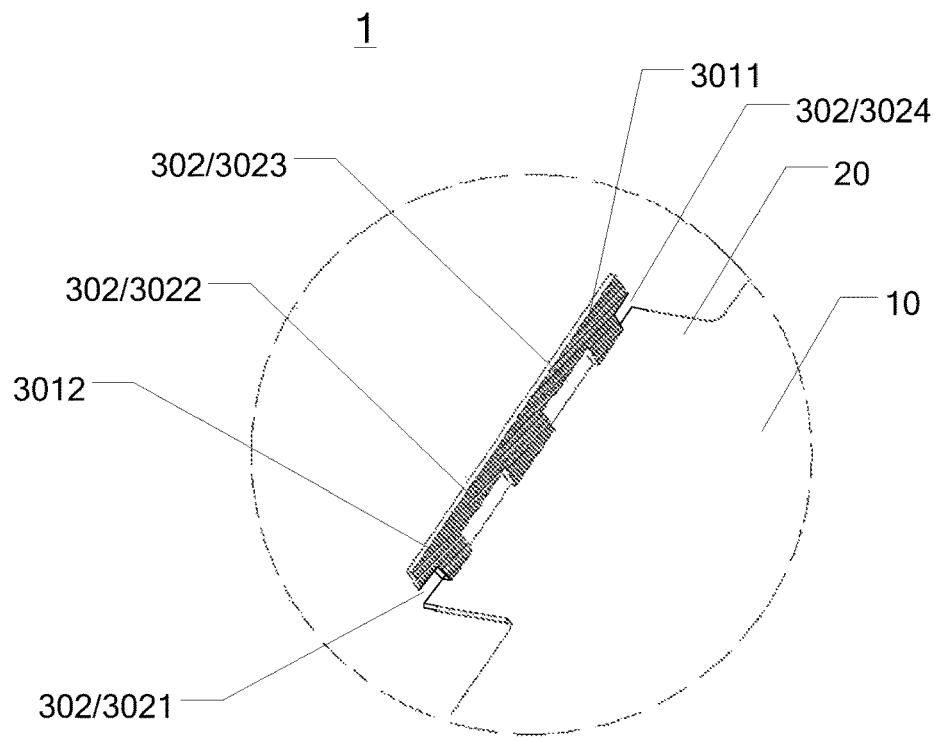
FIG. 12 is a schematic diagram of a film provided by the ninth embodiment of the disclosure.

The difference between the embodiment and the first embodiment is that: as illustrated in FIG. 12, the positioning structure 30 includes a plurality of openings 302, and not only includes closed openings but also may include unclosed openings. Two openings 3022 and 3023 in the middle in FIG. 12 are closed openings, and openings 3021 and 3024 at both ends are unclosed openings. The arrangement of the unclosed openings is favorable for the matching of the film 1 and the frame.

Tenth Embodiment

Figure 13:
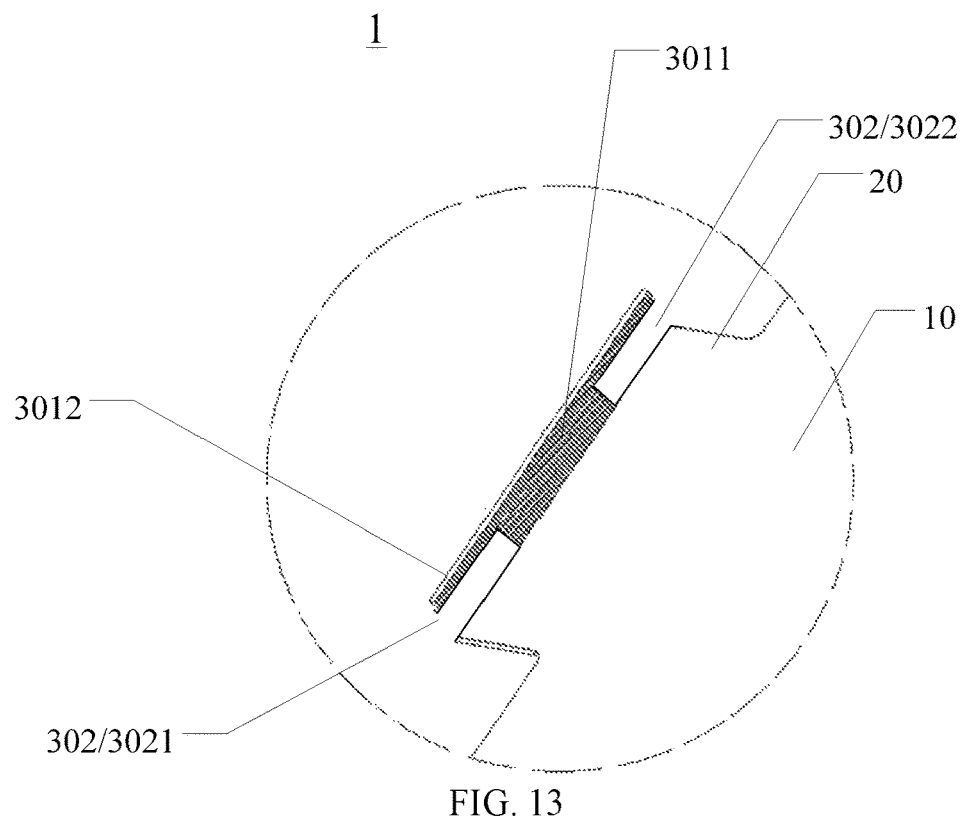
FIG. 13 is a schematic diagram of a film provided by the tenth embodiment of the disclosure.

The difference between the embodiment and the first embodiment 1 is that: as illustrated in FIG. 13, the positioning structure 30 includes two openings 302; and both the two openings 3021 and 3022 may be unclosed openings.

Therefore, in the embodiment of the disclosure, the openings of the positioning structure 30 may be all closed, may be all unclosed, and may not only include closed openings but also include unclosed openings, as long as the openings can be cooperated with the second body 301 to have the function of positioning the second film 2. No limitation is given to the form of the openings.

The film 1 provided by the disclosure may be any film required to be matched with other films for positioning, and for example, may be an optical film in a backlight module.

Eleventh Embodiment

Figure 14:
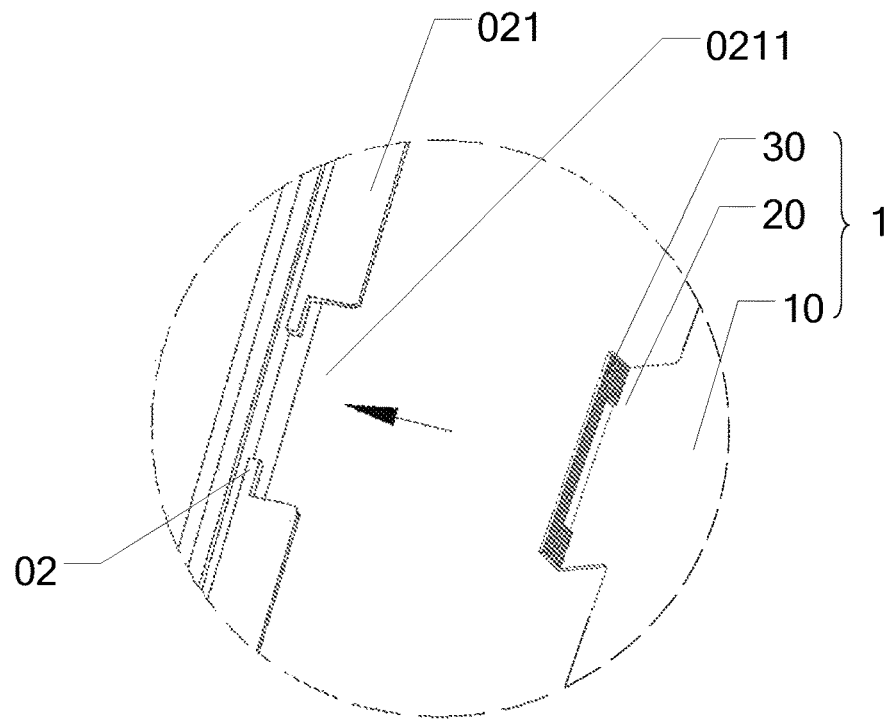
FIG. 14 is a schematic diagram of a backlight module provided by the eleventh embodiment of the disclosure.
Figure 15:
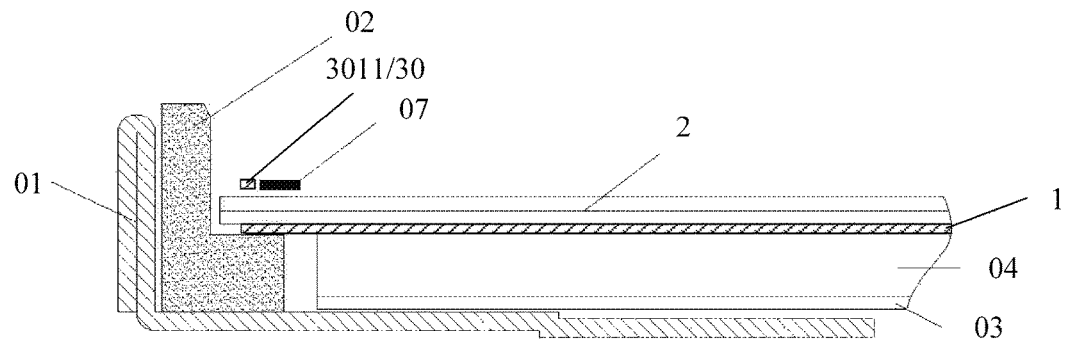
FIG. 15 is a front view of the backlight module provided by the eleventh embodiment of the disclosure.

The embodiment provides a backlight module, which at least includes a plurality of optical films. At least one optical film is the film 1 provided by any foregoing embodiment. For example, in one example, the backlight module comprises the film 1 provided by the first embodiment (as illustrated in FIG. 4a) and the positioned second film 2 (as illustrated in FIG. 4b). Both the film 1 and the second film 2 are optical films. As illustrated in FIG. 14, the backlight module further comprises a frame 02; the frame 02 includes a groove 0211 disposed on the inner side of the frame 02 and recess into a body 021 of the frame; the film 1 is disposed in the frame 02; and the protrusion 20 of the film 1 is disposed in the groove 0211 of the frame 02 to position the film 1. The positioned film (the second film 2) may be one or more, which is not limited in the embodiment. The second protrusion of the second film 2 may pass through the openings of the positioning structure of the first film 1, and the first protrusion of the second film 2 may also be disposed in the groove 0211 of the frame 02. The front view of the example may be as illustrated in FIG. 15. The backlight module further comprises a backplane 01, a reflector 03, an LGP 04 and a film fixing adhesive tape 07. Those relevant to the backplane 01, the reflector 03, the LGP 04 and the film fixing adhesive tape 07 may refer to the description in FIG. 1. For example, the film 1 may be disposed on the LGP 04 and makes contact with the LGP 04, and other optical films disposed on the film 1 may be taken as the second film 2 and positioned by the film 1, so the films on the LGP 04 in the backlight module can be well positioned. Therefore, the embodiment can avoid poor structure and poor image quality caused by the jumping and the shifting of the optical films, and improve the structural stability and the quality of the backlight. For example, the film 1 is a diffuser; the second film 2 is a brightness enhancement film; and the second film includes a first brightness enhancement film and a second brightness enhancement film, but not limited thereto. For example, the second film 2 includes another diffuser and a brightness enhancement film. The optical function of the positioned film is not limited in the embodiment.

Figure 16:
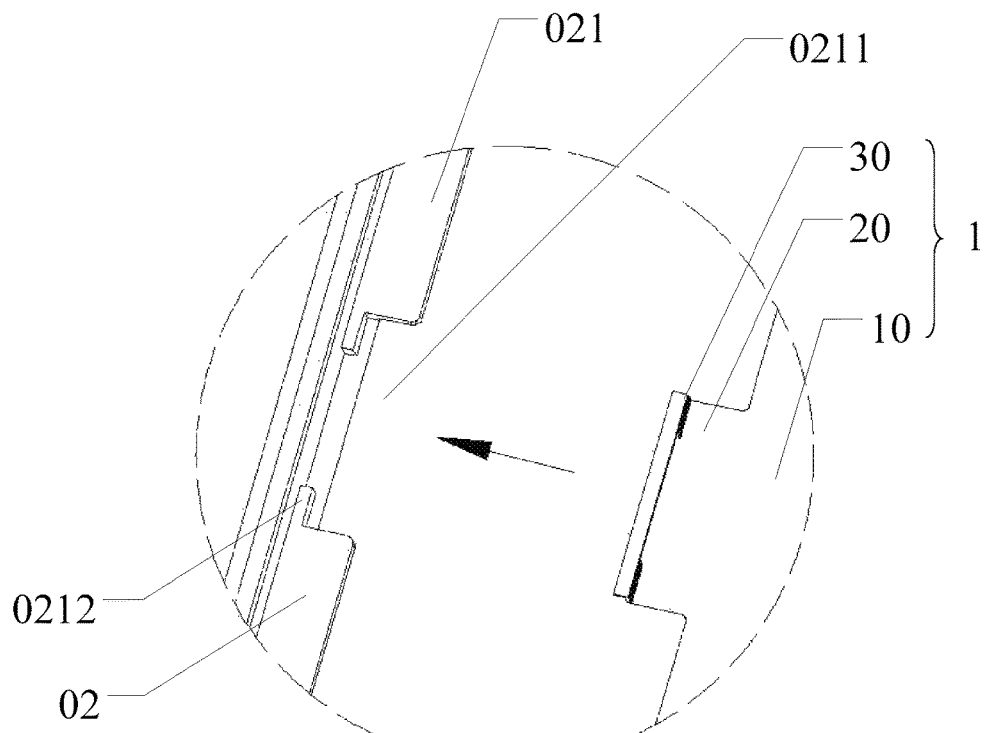
FIG. 16 is a schematic diagram of another backlight module provided by the eleventh embodiment of the disclosure.
Figure 17:
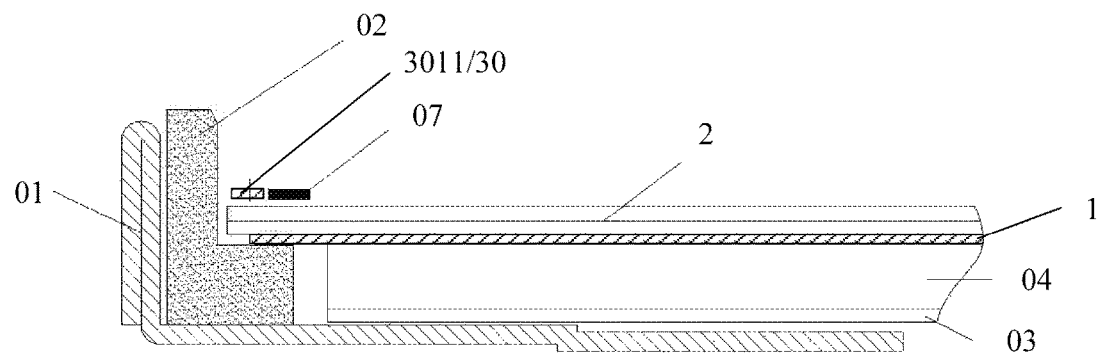
FIG. 17 is a front view of another backlight module provided by the eleventh embodiment of the disclosure.

In another example different from the above example, as illustrated in FIG. 16, the backlight module comprises the film 1 provided by the fifth embodiment (as illustrated in FIG. 8). The front view of this example may be as illustrated in FIG. 17.

Figure 18:
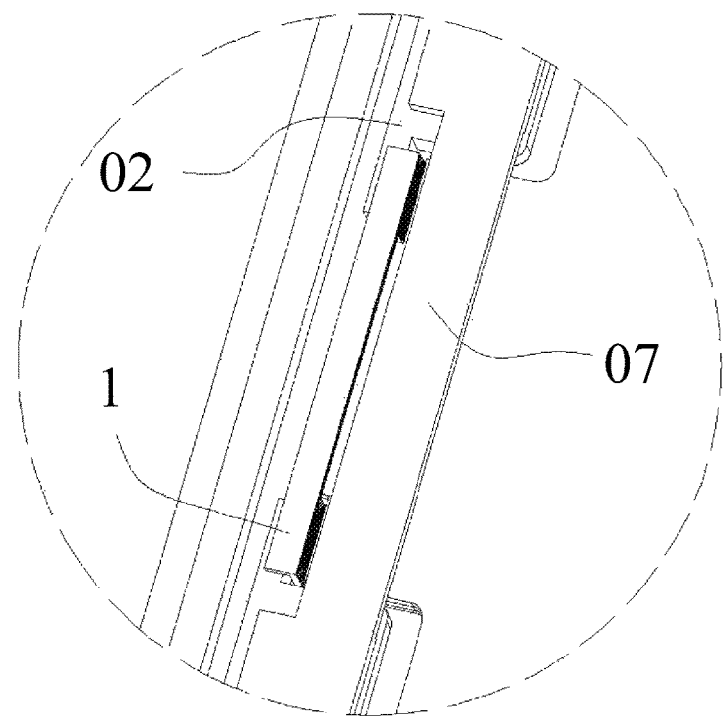
FIG. 18 is a schematic diagram illustrating the positioning of a film of another backlight module provided by the eleventh embodiment of the disclosure.

As illustrated in FIG. 16, the frame 02 includes two projections 0212 projected from both ends of the groove 0211 to the middle of the groove 0211, between the groove 0211 of the frame 02 and the outer side of the frame 02; and the two projections 0212 are spaced from each other in the extension direction of the frame 02. In the process of mounting the first film, at least one part of the blocking portion 3011 of the positioning structure 30 of the first film 1 may be lapped over the two projections 0212 (as illustrated in FIG. 18). In addition, as the second protrusion of the second film 2 may run through the opening of the positioning structure of the first film 1, the second protrusion of the second film 2 may also be stretched into a gap between the two projections 0212.

As illustrated in FIG. 18, after the film 1 is assembled, the second film 2 at the positioning wing is inserted into the opening structure by utilization of the second protrusion 70 as illustrated in FIG. 4b and then is fixed by utilization of the film fixing adhesive tape 07. Due to the movement limitation by the "door opening" structure, in the transport process or the assembly process, the positioned film such as the second film 2 on the film 1 will not jump to the outside of the positioning groove. Meanwhile, due to the limitation of the structure, the probability of the non-adhesive area being extruded by the positioned optical film such as the second film 2 below in the vertical direction is greatly reduced, and the fixing function of the film fixing adhesive tape is guaranteed.

Twelfth Embodiment

The embodiment provides a display device, which comprises the backlight module provided by the eleventh embodiment. The display device may be any display device which requires a backlight module to provide backlight. For example, the display device may be a display device such as an LCD, e-paper and an organic light-emitting diode (OLED) display and any product or component having display function such and comprising the display device, e.g., a TV, a digital camera, a mobile phone, a watch, a tablet PC, a notebook computer and a navigator.

The following points should be noted:

(1) Unless otherwise specified, in the embodiments of the disclosure and the accompanying drawings, the same reference numeral of the accompanying drawing represents the same meaning;

(2) The accompanying drawings of the embodiments of the disclosure only involve the structures relevant to the embodiments of the disclosure, and other structures may refer to the conventional design.

(3) For clarity, in the accompanying drawings of the embodiments of the disclosure, the thickness of layers or regions is enlarged. It should be understood that: when an element such as a layer, a film, a region or a substrate is referred to as being disposed "on" or "beneath" another element, the element may be "directly" disposed "on" or "beneath" another element, or an intermediate element may be provided.

(4) The characteristics in the same embodiment or different embodiments of the disclosure may be mutually combined without conflict.

The foregoing is only the preferred embodiments of the disclosure and not intended to limit the scope of protection of the disclosure. Any change or replacement that may be easily thought of by those skilled in the art within the technical scope disclosed by the disclosure shall fall within the scope of protection of the disclosure. Therefore, the scope of protection of the disclosure shall be defined by the appended claims.

The application claims priority to the Chinese patent application No. 201610711590.8, filed Aug. 23, 2016, the disclosure of which is incorporated herein by reference as part of the application.

The invention claimed is:

1. A film, comprising:
a first body having a platy structure, a protrusion protruded from an edge of the first body in a plane where the first body is located, and a positioning structure intersected with one surface of the protrusion, wherein the positioning structure includes a second body and one or more openings; the second body includes a blocking portion and a connecting portion; the blocking portion is connected with the protrusion through the connecting portion; and the one or more openings are disposed between the blocking portion and the protrusion;
wherein the connecting portion includes a first connecting portion close to the protrusion and a second connecting portion close to the blocking portion; the first connecting portion is intersected with the second connecting portion; the first connecting portion and the second connecting portion have a platy structure; an angle between the first connecting portion and the second connecting portion is about 90 degrees; an angle between the blocking portion and the second connecting portion is about 180 degrees; and an angle between the first connecting portion and the protrusion is about 90 degrees.

2. The film according to claim 1, wherein the one or more openings have an edge close to the protrusion, and the edge is level with the surface of the protrusion.

3. The film according to claim 1, wherein a length of the one or more openings is ½ to ⅔ of a length of the positioning structure in a direction of an intersecting line of the positioning structure and the protrusion.

4. The film according to claim 1, wherein the positioning structure includes a plurality of openings; and the plurality of openings is sequentially arranged along a direction of an intersecting line of the positioning structure and the protrusion.

5. The film according to claim 1, wherein the connecting portion has a planar surface.

6. The film according to claim 5, wherein an angle between the connecting portion and the protrusion is about 90 degrees.

7. The film according to claim 6, wherein an angle between the blocking portion and the connecting portion is about 90 degrees or 180 degrees.

8. The film according to claim 7, wherein the angle between the blocking portion and the connecting portion is about 90 degrees; and the blocking portion and the protrusion are respectively disposed on both sides of a plane where the connecting portion is located.

9. The film according to claim 1 wherein the protrusion includes one or more openings; and the one or more openings of the protrusion are communicated with the one or more openings of the positioning structure.

10. The film according to claim 1, wherein the blocking portion includes a first blocking portion and a second blocking portion; the first blocking portion is connected with the protrusion through the connecting portion; an angle between the first blocking portion and the connecting portion is about 180 degrees; and an angle between the second blocking portion and the first blocking portion is about 90 degrees.

11. The film according to claim 1, wherein the connecting portion includes a first part intersected with the protrusion and provided with a plane; and an angle between the first part and the protrusion is greater than 0 degree and less than 180 degrees.

12. The film according to claim 11, wherein the angle between the first part and the protrusion is about 90 degrees.

13. The film according to claim 1, wherein the film is a diffuser.

14. A backlight module, comprising the film according to claim 1.

15. The backlight module according to claim 14, further comprising a frame, wherein the frame includes a groove disposed on an inner side of the frame and recessed into a body of the frame; the film is disposed in the frame; and the protrusion of the film is disposed in the groove of the frame to position the film.

16. The backlight module according to claim 14, further comprising a second film, wherein the second film includes a body having a platy structure and a protrusion protruded from an edge of the body of the second film in a plane where the body of the second film is located; and the protrusion of the second film passes through the one or more openings of the positioning structure to position the second film.

17. The backlight module according to claim 16, wherein the protrusion of the second film includes a first protrusion close to the body of the second film and one or more second protrusions protruded from an edge of the first protrusion away from the body of the second film; and the one or more second protrusions pass through the one or more openings of the positioning structure.

18. The backlight module according to claim 17, wherein the frame includes two projections projected from both ends of the groove to the middle of the groove, between the groove of the frame and an outer side of the frame; the two projections are spaced from each other in an extension direction of the frame; and at least one part of the blocking portion of the first film is lapped over the two projections.

19. A display device, comprising the backlight module according to claim 1.

* * * * *